US008709676B2

(12) United States Patent
Liu et al.

(10) Patent No.: US 8,709,676 B2
(45) Date of Patent: Apr. 29, 2014

(54) CHEMICALLY BONDED CARBON NANOTUBE-POLYMER HYBRID AND NANOCOMPOSITE THEREOF

(75) Inventors: Ying-Ling Liu, Taoyuan County (TW); Chia-Ming Chang, Taoyuan County (TW)

(73) Assignee: Chung Yuan Christian University, Tao-Yuan (TW)

(*) Notice: Subject to any disclaimer, the term of this patent is extended or adjusted under 35 U.S.C. 154(b) by 521 days.

(21) Appl. No.: 12/783,810

(22) Filed: May 20, 2010

(65) Prior Publication Data

US 2011/0217618 A1    Sep. 8, 2011

(30) Foreign Application Priority Data

Mar. 8, 2010    (TW) .............................. 99106679 A

(51) Int. Cl.
C08F 8/00    (2006.01)

(52) U.S. Cl.
USPC ...................................................... 429/479

(58) Field of Classification Search
CPC ........................................................ C08F 8/00
USPC ........................................................ 429/479
See application file for complete search history.

(56) References Cited

U.S. PATENT DOCUMENTS

| 6,783,702 | B2* | 8/2004 | Niu et al. ...................... 977/742 |
| 2007/0158020 | A1* | 7/2007 | Tu et al. ........................ 264/483 |
| 2007/0202403 | A1* | 8/2007 | Oh et al. ........................ 429/217 |
| 2011/0118361 | A1* | 5/2011 | Matoishi et al. ........... 514/772.1 |

FOREIGN PATENT DOCUMENTS

WO    WO 2009087961 A1 *    7/2009

OTHER PUBLICATIONS

W. F. Chen, J. S. Wu and P. L. Kuo, "Poly(oxyalkylene)diamine-Functionalized Carbon Nanotube/ Perfluorosulfonated Polymer Composites: Synthesis, Water State, and Conductivity", Chem. Mater., 2008, 20, 5756.*
Chia-Ming Chang and Ying-Ling Liu "Functionalization of multi-walled carbon nanotubes with non-reactive polymers through an ozone-mediated process for the preparation of a wide range of high performance polymer/carbon nanotube composites" Dec. 6, 2009, 10 pages, Department of Chemical Engineering and R&D Center for Membrane Technology, Chung Yuan Christian University, Chungli, Taoyuan 32023, Taiwan.

* cited by examiner

Primary Examiner — Yogendra Gupta
Assistant Examiner — Alison Hindenlang
(74) Attorney, Agent, or Firm — WPAT, PC; Justin King

(57) ABSTRACT

The present invention provides a chemically bonded carbon nanotube-polymer hybrid and the nanocomposite thereof, having the following advantages: functionalizing carbon nanotubes and also effectively having the carbon nanotube covalently bonded with a wide variety of polymers, even for stable and non-reactive polymers, such as commercially available polymers and high performance engineering plastics. The nanocomposite material according to the invention, compared to its matrix polymer, has higher mechanical strength, conductivity, proton conductivity, and heat stability.

13 Claims, 2 Drawing Sheets

CHEMICALLY BONDED CARBON NANOTUBE-POLYMER HYBRID AND NANOCOMPOSITE THEREOF

BACKGROUND OF THE INVENTION

1. Field of the Invention

The present invention is generally related to a carbon nanotube-polymer hybrid and the nanocomposite thereof, and more particularly to a chemically bonded carbon nanotube-polymer hybrid and the nanocomposite thereof.

2. Description of the Prior Art

Carbon nanotubes (CNTs) have shown attractive properties, such as light-weight, high strength, high toughness, high specific surface area, high thermal conductivity, that make them potentially useful in many applications. However, CNTs require organic functionalization to increase their solubility in organic solvents, compatibility with organic polymers, and processibility. The functionalization of CNTs with polymers has received much research attention because the products show the combined properties of CNTs and polymers. Most of the approaches require the pre-modification of CNTs to introduce functional groups to CNT surfaces, making the CNTs capable of reacting to the reactive groups of polymer chains. On the other hand, the preparation of CNT-polymer hybrids can use pristine (unmodified) CNTs. Polymers possessing functional groups that are reactive toward CNTs are suitable materials for functionalization of CNTs through this method.

The polymers capable of being covalently incorporated to CNTs are limited to two categories. The first category is polymers possessing functional groups that are reactive toward CNTs and the second category is polymers obtained with in situ polymerization. For example, the polymers possessing functional groups that are reactive toward CNTs can be polyamide having maleimide groups that react to CNTs through Diels-Alder reaction. But, the disadvantage of using the first category of polymers is that a specific method for reacting to CNTs is required for each different polymer. In addition, another disadvantage is that polymers have to possess functional groups that are reactive toward CNTs.

Polymer-functionalized CNTs, compared to the unmodified ones, usually show relatively good solubility in organic solvents and high compatibility to polymer matrix in CNT/polymer composites. However, the organic portions of functionalized CNTs are considered to be "impurities" that induce microscopic separation in the CNT/polymer composites and harm their properties. Therefore, the preferred method is to use polymers that are structurally close to the matrix polymers in CNT functionalization to decrease the "impurity" effect.

On the other hand, there is no reported method to have stable and non-reactive polymers, particularly like commercially available polymers and high performance engineering plastics, covalently bonded to pristine CNTs. That is, currently there is no general approach to functionalize CNTs to have CNTs and various matrix polymers covalently bonded.

The applications of CNTs to the modification of polymers demonstrate the improvements in the mechanical properties and conductivity of the polymers as well as the increase in their proton conductivity for a proton conductive membrane.

SUMMARY OF THE INVENTION

In light of the above background, in order to fulfill the industrial requirements, the invention provides a chemically bonded carbon nanotube-polymer hybrid and the nanocomposite thereof by utilizing various polymers, such as stable and non-reactive polymers, particularly like commercially available polymers and high performance engineering plastics.

One characteristic of the present invention is to provide a chemically bonded carbon nanotube-polymer hybrid, comprising: a polymer; and at least one carbon nanotube, chemically bonded to the polymer chain of the polymer; wherein the polymer is processed by an ozone-mediated process to form at least one reactive moiety to react with the carbon nanotube to thereby generate the nanotube-polymer hybrid.

Another characteristic of the present invention is to provide a nanocomposite, comprising: at least one first polymer; at least one carbon nanotube, chemically bonded to the polymer chain of the first polymer to form a nanotube-first-polymer hybrid; and at least one second polymer, the polymer matrix of which is dispersed with the nanotube-first-polymer hybrid; wherein the first polymer is processed by an ozone-mediated process to form at least one reactive moiety on the polymer chain of the first polymer to react with the carbon nanotube to thereby generate the nanotube-first-polymer hybrid.

Another characteristic of the present invention is to provide a nanocomposite film, which is formed by the above mentioned nanocomposite to have the increased mechanical strength, conductivity, or proton conductivity.

Accordingly, the present invention discloses a chemically bonded carbon nanotube-polymer hybrid and the nanocomposite thereof and the present invention has the advantages of effectively covalently bonding CNTs and various matrix polymers, even for stable and non-reactive polymers, such as commercially available polymers and high performance engineering plastics. Therefore, this present invention does have the economic advantages for industrial applications.

DESCRIPTION OF THE PREFERRED EMBODIMENTS

Figure 1:
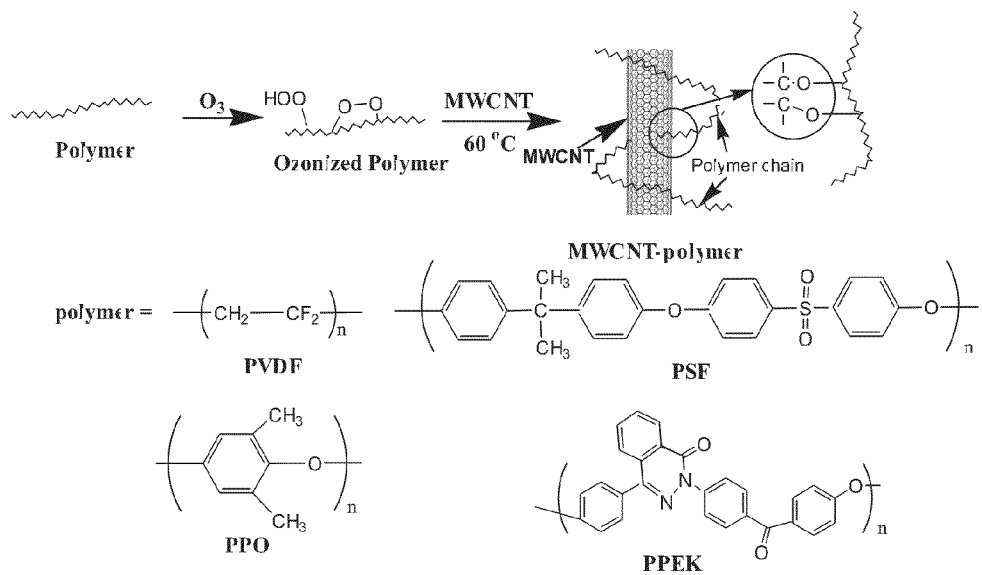
FIG. 1 shows a process flow of the formation of the carbon nanotube-polymer hybrid according to one embodiment of the present invention.

What is probed into the invention is a chemically bonded carbon nanotube-polymer hybrid and the nanocomposite thereof. Detail descriptions of the processes and elements will be provided in the following in order to make the invention thoroughly understood. Obviously, the application of the invention is not confined to specific details familiar to those who are skilled in the art. On the other hand, the common processes and elements that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

In a first embodiment of the present invention, a chemically bonded carbon nanotube-polymer hybrid is disclosed. The carbon nanotube-polymer hybrid comprises a polymer; and at least one carbon nanotube, chemically bonded to the polymer chain of the polymer; wherein the polymer is processed by an ozone-mediated process to form at least one reactive moiety to react with the carbon nanotube to thereby generate the nanotube-polymer hybrid.

In the above embodiment, the carbon nanotube can comprise one type of the following carbon nanotube or any combination thereof: single walled carbon nanotube or multi-walled carbon nanotube (MWCNT).

In the above embodiment, the polymer can be selected from the group consisting of the following or any combination thereof: polyimide, poly(amid acid), vinyl polymer, polysulfone, polyphenylene oxide, and heterocyclic ether ketone polymer. Specifically, the polymer can be poly(vinylidene fluoride) (PVDF), polysulfone (PSF), poly(2,6-dimethylphenylene oxide) (PPO), poly(phthalazinone ether ketone) (PPEK), sulfonated fluoropolymer (such as Nafion), or any combination of the above examples.

In the above embodiment, the reactive moiety can be an alkylperoxide moiety, a hydroperoxide moiety, an oxygen radical or any combination of the above.

In the above embodiment, the ozone-mediated process is to have a mixture of ozone and oxygen gas flow through the polymer.

In the above embodiment, the tensile strength, Young's modulus, proton conductivity, and conductivity of the hybrid are increased, compared to the polymer.

In a second embodiment of the present invention, a nanocomposite is disclosed. The nanocomposite comprises: at least one first polymer; at least one carbon nanotube, chemically bonded to the polymer chain of the first polymer to form a nanotube-first-polymer hybrid; and at least one second polymer, the polymer matrix of which is dispersed with the nanotube-first-polymer hybrid; wherein the first polymer is processed by an ozone-mediated process to form at least one reactive moiety on the polymer chain of the first polymer to react with the carbon nanotube to thereby generate the nanotube-first-polymer hybrid.

In the above embodiment, the carbon nanotube can comprise one type of the following carbon nanotube or any combination thereof: single walled carbon nanotube or multi-walled carbon nanotube (MWCNT).

In the above embodiment, the first polymer and the second polymer can be separately selected from the group consisting of the following or any combination thereof: polyimide, poly(amid acid), vinyl polymer, polysulfone, polyphenylene oxide, and heterocyclic ether ketone polymer. Specifically, the first polymer and the second polymer separately can be poly(vinylidene fluoride) (PVDF), polysulfone (PSF), poly(2,6-dimethylphenylene oxide) (PPO), poly(phthalazinone ether ketone) (PPEK), sulfonated fluoropolymer (such as Nafion), or any combination of the above examples.

In the above embodiment, the reactive moiety can be an alkylperoxide moiety, a hydroperoxide moiety, an oxygen radical or any combination of the above.

In the above embodiment, the ozone-mediated process is to have a mixture of ozone and oxygen gas flow through the first polymer.

In the above embodiment, the tensile strength, Young's modulus, proton conductivity, and conductivity of the hybrid are increased, compared to the first polymer and the second polymer.

In a third embodiment of the present invention, a nanocomposite film is disclosed. The nanocomposite film is formed by the nanocomposite material according to the second embodiment of the invention.

In the above embodiment, the ratio of the nanotube-first-polymer hybrid to the second polymer in weight is, but not limited to, about 0.01~5% and preferably 0.05~2%.

In the above embodiment, when the first polymer and the second polymer are sulfonated fluoropolymers (such as Nafion), the above nanocomposite film can be applied in the proton exchange membrane of a fuel cell.

It should be noted that the polymers used to form the chemically bonded carbon nanotube-polymer hybrid, the nanocomposite, and the nanocomposite film according to the embodiments of the present invention can be stable and non-reactive polymers, especially like commercially available polymers and high performance engineering plastics. The above mentioned polymers in the above and the following paragraphs are only used as examples for some specific applications.

It should be noted that the following examples are used to demonstrate the possible implementation of the present invention and those who are skilled in the art can understand from the description to implement the present invention by various current or future methods.

Example 1

Preparation of a MWCNT-PVDF Hybrid

The commercial products of PVDF (Elf Atochem Inc. USA, Kynar K-761) and MWCNT (Carbon nanotube Co., Ltd., Incheon, Korea) are used. The purity of the MWCNT is 93% and was washed with dimethylsulfoxide (DMSO) prior to use. PVDF (0.3 g) was dissolved in 30 ml of 1-methyl-2-pyrrolidinone to form a PVDF polymer solution. A continuous stream of an $O_3/O_2$ mixture (flow rate 6 L/min; $O_3$ concentration 28 g/m$^3$), which are generated by an ozone generator (Ozone group, Taiwan), then bubbled through the PVDF polymer solution at room temperature for 15 min. After the addition of 0.1 g MWCNT, the mixture was reacted at 60° C. for 30 min. MWCNTs were then collected with the filtration, washed with tetrahydrofuran, and dried under vacuum to give the product of MWCNT-PVDF (0.105 g). The PVDF fraction of MWCNT-PVDF measured with TGA is about 9 wt %. FIG. 1 shows a process flow of the formation of the carbon nanotube-polymer hybrid according to one embodiment of the present invention.

Example 2

Preparation of a MWCNT-PSF Hybrid

The preparation method that is the same as that of the example 1 is used except for using polysulfone (PSF, from Amoco Performance Inc. USA) as the polymer instead of PVDF and using DMF (N,N-dimethylformaldehyde) to dissolve PSF instead of 1-methyl-2-pyrrolidinone. The product MWCNT-PSF is obtained.

Example 3

Preparation of a MWCNT-PPO Hybrid

The preparation method that is the same as that of the example 1 is used except for using poly(2,6-dimethylphenylene oxide (PPO, from General Electric Plastics) as the polymer instead of PVDF and using toluene to dissolve PPO instead of 1-methyl-2-pyrrolidinone. The product MWCNT-PPO is obtained.

Example 4

Preparation of a MWCNT-PPEK Hybrid

The preparation method that is the same as that of the example 1 is used except for using poly(phthalazinone ether ketone) (PPEK, from Dalian Polymer New Material Co., Ltd., China) as the polymer instead of PVDF and using chloroform to dissolve PPEK instead of 1-methyl-2-pyrrolidinone. The product MWCNT-PPEK is obtained.

Example 5

Preparation of a MWCNT-Nafion Hybrid

Commercially available Nafion® disperson (Dupont Fluoroproducts DE-202) is used as the first polymer and MWCNT (Carbon nanotube Co., Ltd., Incheon, Korea) is used as the carbon nanotubes. Nafion® disperson (20 wt %, 1.0 g) was added with 5 mL of isopropanol aqueous solution (50%). A continuous stream of $O_3/O_2$ mixture (flow rate 6 L/min; $O_3$ concentration 28 g/m$^3$), which was generated by an ozone generator (Ozone Group, Taiwan), was bubbled through the solution at room temperature for 15 min. After addition of 0.1 g MWCNT, the mixture was reacted at 60° C. for 30 min. MWCNTs were then collected with filtration, washed with isopropanol, and then dried under vacuum to give the product of MWCNT-Nafion (0.102 g).

Example 6

Preparation of a PVDF/MWCNT-PVDF Composite Film

PVDF (the second polymer) was dissolved in DMF to result in a 15 wt % solution. A predicted amount of MWCNT-PVDF dispersed in DMF (1 wt %) was added to the PVDF solution. The obtained solution was put in an ultrasonic bath for 1 h and then cast on a glass plate with a casting knife. The thickness set for the casting knife was 300 μm. After drying at 100° C. for 24 h, self-standing PVDF/MWCNT-PVDF composite film was obtained.

Figure 2:
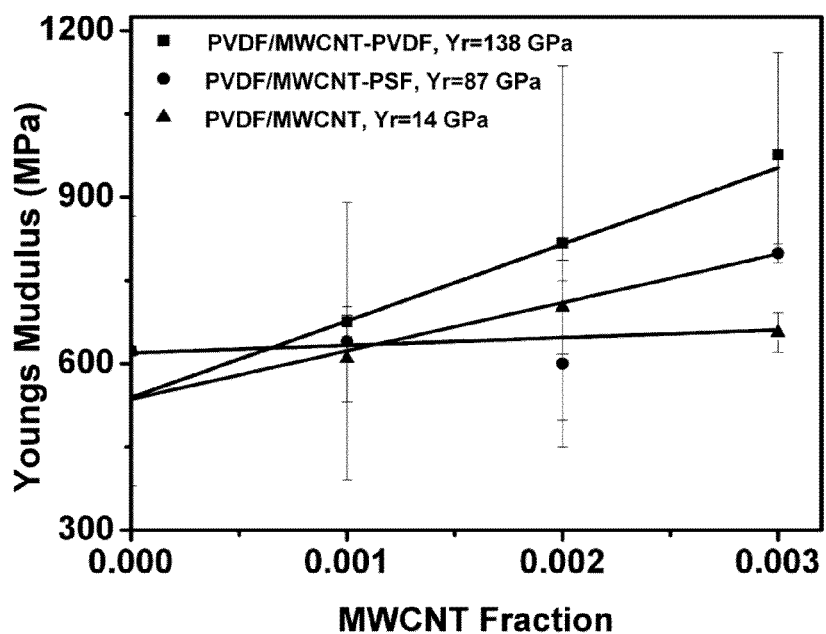
FIG. 2 shows plots of Young's modulus vs. MWCNT fractions of composite films according to one embodiment of the present invention.

By the same method described in the above paragraph, other composite films, such as PVDF/MWCNT and PVDF/MWCNT-PSF composite films, can be prepared. FIG. 2 shows plots of Young's modulus vs. MWCNT fractions of composite films. From FIG. 2, the Young's modulus (Yr) of the PVDF/MWCNT-PVDF composite film is Yr=138 GPa, that of the PVDF/MWCNT-PSF composite film is Yr=87 GPa, and that of the PVDF/MWCNT composite film is Yr=14 GPa. The high Yr value indicates good stress transfer in the composites and the compatibility between PVDF matrix and MWCNT-PVDF.

Figure 3:
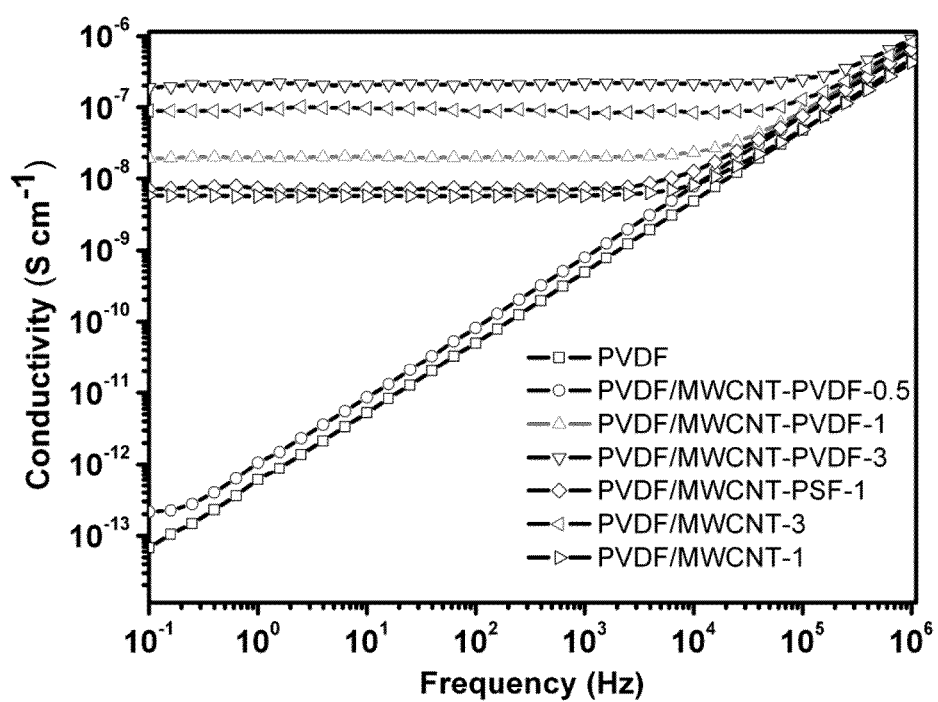
FIG. 3 shows the relationship between the conductivity and frequency of PVDF composite films formed by adding different MWCNT fractions.

Furthermore, FIG. 3 shows the relationship between the conductivity and frequency of PVDF composite films formed by adding different MWCNT fractions. As shown in FIG. 3, the number 0.5 of PVDF/MWCNT-PVDF-0.5 indicates adding 0.5 wt % of MWCNT-PVDF. From FIG. 3, the addition of MWCNT increases the conductivity of composite film, particularly for MWCNT-PVDF.

Example 7

Preparation of a Nafion/MWCNT-Nafion Composite Film

A predicted amount of the MWCNT-Nafion hybrid (obtained from the example 6; CNT-first-polymer hybrid) dispersed in isopropanol (1 wt %) was added to the Nafion® dispersion solution. The obtained solution was put in an ultrasonic bath for 1 h and then cast on a glass plate with a casting knife. The thickness set for the casting knife was 300 μm. After drying at 100° C. for 24 h and annealing at 140° C. under vacuum for 4 h, self-standing Nafion/MWCNT-Nafion composite membranes were obtained.

Example 8

Preparation of a Single Fuel Cell

Commercially available Nafion® disperson (Dupont Fluoroproducts DE-202) is used as the first polymer and MWCNT (Carbon nanotube Co., Ltd., Incheon, Korea) is used as the carbon nanotubes. Nafion® disperson (20 wt %, 1.0 g) was added with 5 mL of isopropanol aqueous solution (50%). A continuous stream of $O_3/O_2$ mixture (flow rate 6 L/min; $O_3$ concentration 28 g/m$^3$), which was generated by an ozone generator (Ozone Group, Taiwan), was bubbled through the solution at room temperature for 15 min. After addition of 0.1 g MWCNT, the mixture was reacted at 60° C. for 30 min. MWCNTs were then collected with filtration, washed with isopropanol, and then dried under vacuum to give the product of MWCNT-Nafion (0.102 g).

A predicted amount of the MWCNT-Nafion hybrid (obtained from the example 6; CNT-first-polymer hybrid) dispersed in isopropanol (1 wt %) was added to the Nafion® dispersion solution. The obtained solution was put in an ultrasonic bath for 1 h and then cast on a glass plate with a casting knife. The thickness set for the casting knife was 300 μm. After drying at 100° C. for 24 h and annealing at 140° C. under vacuum for 4 h, self-standing Nafion/MWCNT-Nafion composite membranes were obtained. The membranes were boiled in 0.5 M sulfuric acid for 1 h to protonate the membranes followed by washing with boiling deionized (DI) water to remove sulfuric acid. These membranes were stored in deionized (DI) water prior to use.

A MEA (membrane electrode assembly) was prepared with thermal pressing the E-tek electrodes (Pt and Nafion loading for anode and cathode were both 0.5 mg cm$^{-2}$) and the Nafion-based membranes at 120° C. and 1 ton for 3 min. The single cell tests on the MEAs were carried out at 65° C. with humidified hydrogen and oxygen (flow rate 400 sccm). In the single cell tests, the current density at 0.6 V and the maximum power density measured with the Nafion/MWCNT-Nafion-0.05 composite membrane (addition of 0.05 wt % MWCNT-Nafion) are 1556 mA cm$^{-2}$ and 650 mW cm$^{-2}$, respectively. Both of the values are 1.5-folds of the values measured with the pristine Nafion membrane.

Therefore, the polymers used to form the chemically bonded carbon nanotube-polymer hybrid, the nanocomposite, and the nanocomposite film according to the embodiments of the present invention can be stable and non-reactive polymers, especially like commercially available polymers and high performance engineering plastics. The chemically bonded carbon nanotube-polymer hybrid, the nanocomposite, and the nanocomposite film according to the embodiments of the present invention can increase the mechanical strengths and conductivity of the matrix polymers.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A method for forming chemically bonded carbon nanotube-polymer hybrid, comprising:
   providing a polymer;
   performing an ozone-mediated process to the polymer to form at least one reactive moiety at the polymer; and
   providing at least one carbon nanotube, wherein the at least one carbon nanotube is chemically bonded to the at least one reactive moiety of the polymer to produce the nanotube-polymer hybrid.

2. The method according to claim 1, wherein the carbon nanotube comprises one type of the following carbon nanotube or any combination thereof: single walled carbon nanotube or multi-walled carbon nanotube.

3. The method according to claim 1, wherein the polymer is selected from the group consisting of the following or any combination thereof: vinyl polymer, polysulfone, polyphenylene oxide, and heterocyclic ether ketone polymer.

4. The method according to claim 1, wherein the polymer is selected from the group consisting of the following or any combination thereof: polyimide, poly(amid acid), vinyl polymer, polysulfone, polyphenylene oxide, and heterocyclic ether ketone polymer.

5. The method according to claim 1, wherein the polymer is selected from the group consisting of the following or any combination thereof: poly(vinylidene fluoride) (PVDF), polysulfone (PSF), poly(2,6-dimethylphenylene oxide) (PPO), poly(phthalazinone ether ketone) (PPEK), sulfonated fluoropolymer (such as Nafion).

6. The method according to claim 1, wherein the reactive moiety is selected from the group consisting of the following or any combination thereof: alkylperoxide moiety, hydroperoxide moiety, and oxygen radical.

7. The method according to claim 1, wherein the ozone-mediated process is to have a mixture of ozone and oxygen gas flow through the polymer.

8. A method for forming nanocomposite, comprising:
   providing at least one first polymer, wherein said first polymer is processed by an ozone-mediated process to form at least one reactive moiety on the polymer chain of said first polymer;
   providing at least one carbon nanotube, wherein said carbon nanotube is chemically bonded to the polymer chain of the first polymer by reacting with the at least one reactive moiety on the polymer chain of said first polymer to form a nanotube-first-polymer hybrid; and
   providing at least one second polymer, wherein a polymer matrix of said second polymer is dispersed with the nanotube-first-polymer hybrid.

9. The method according to claim 8, wherein the carbon nanotube comprises one type of the following carbon nanotube or any combination thereof: single walled carbon nanotube or multi-walled carbon nanotube.

10. The method according to claim 8, wherein the first polymer and the second polymer are separately selected from the group consisting of the following or any combination thereof: vinyl polymer, polysulfone, polyphenylene oxide, and heterocyclic ether ketone polymer.

11. The method according to claim 8, wherein the first polymer and the second polymer are separately selected from the group consisting of the following or any combination thereof: poly(vinylidene fluoride) (PVDF), polysulfone (PSF), poly(2,6-dimethylphenylene oxide) (PPO), poly(phthalazinone ether ketone) (PPEK), sulfonated fluoropolymer (such as Nafion).

12. The method according to claim 8, wherein the reactive moiety is selected from the group consisting of the following or any combination thereof: alkylperoxide moiety, hydroperoxide moiety, and oxygen radical.

13. The method according to claim 8, wherein the ozone-mediated process is to have a mixture of ozone and oxygen gas flow through the first polymer.

* * * * *